United States Patent [19]
Johnston

[11] 3,875,925
[45] Apr. 8, 1975

[54] SOLAR HEATER

[76] Inventor: John G. Johnston, 33458 Angeles Forest Highway, Palmdale, Calif. 93550

[22] Filed: Jan. 8, 1974

[21] Appl. No.: 431,731

[52] U.S. Cl. ............................................. 126/270
[51] Int. Cl. .............................................. F24j 3/02
[58] Field of Search ......................... 126/270, 271

[56] References Cited
UNITED STATES PATENTS

| | | | |
|---|---|---|---|
| 2,553,073 | 5/1951 | Barnett | 126/271 |
| 2,680,437 | 6/1954 | Miller | 126/270 |
| 2,680,565 | 6/1954 | Löf | 126/271 X |
| 2,998,005 | 8/1961 | Johnston | 126/270 |
| 3,102,532 | 9/1963 | Shoemaker | 126/270 |

Primary Examiner—William F. O'Dea
Assistant Examiner—Peter D. Ferguson
Attorney, Agent, or Firm—Clarence A. O'Brien; Harvey B. Jacobson

[57] ABSTRACT

A fluid such as air is heated by a heliothermal device which provides a flow path for the fluid, and arranges across the fluid flow path a porous barrier which passes solar rays in one direction, but blocks heat from returning through the barrier in a direction opposite to that of the impinging solar rays. The barrier may be constructed in layers from a fibrous material, or as a fabric, metal, or synthetic resin mesh forming a screen.

8 Claims, 6 Drawing Figures

SOLAR HEATER

BACKGROUND OF THE INVENTION

1. Field of the Invention

This invention relates generally to heliotechnology, and particularly to solar heating. 2. Description of the Prior Art It is known that glass will readily emit shortwave solar radiation, but will block the transmission of longer wavelength radiation. See, for example: Baumeister and Marks, *Standard Handbook for Mechanical Engineers*, 7th Edition, McGraw Hill, New York, 1967, pages 9-212 to 9-218, for a general discussion of heliotechnology, and specifically page 9-214 for a discussion of the "Greenhouse effect" of glass. This property of glass causes solar energy to be passed into an enclosure and not be re-radiated from same.

A disadvantage of a material such as glass in this regard, however, is that although glass does not readily pass long-wave radiation of 5 microns or more, glass does readily conduct heat. Further, convection within the enclosure will transmit the trapped heat back to the glass, thus substantially reducing the efficiency of heat collection.

My prior U.S. Pat. No. 2,998,005, issued Aug. 29, 1961, discloses the use of a fibrous mat to recover heat. Air passes transversely through the mat so as to absorb heat therefrom.

SUMMARY OF THE INVENTION

It is an object of the present invention to provide a material having poor thermal conduction and convection characteristics, but will readily admit solar radiation.

It is another object of the present invention to provide an improved solar heater which substantially eliminates losses by radiation or convection to the face which admits the solar radiation.

It is yet another object of the present invention to provide an improved heliothermal process for heating fluids by means of solar radiation.

These and other objects are achieved according to the present invention by providing: a housing forming a flow path for a fluid to be heated, and including a face arranged for passing solar rays impinging thereon, and a heat check valve arranged in the housing across the flow path for accepting heat received from the face and blocking the passage of heat back toward the face.

A preferred housing for a heliothermal device according to the present invention includes a back wall spaced from the face. An inlet and an outlet are provided in this back wall, and are arranged forming part of the flow path for a fluid to be heated.

The heat valve according to the present invention may be constructed in any one of various forms. A preferred embodiment of the heat valve has a substantially planar mat of a porous, preferably fibrous, material formed from two layers. One of the layers is arranged directed toward the housing face and is constructed from, for example, a fibrous material having a very low density, and the other of the layers is arranged directed toward the back wall and is constructed from, for example, a fibrous material having a density higher than the density of the one layer.

Another preferred embodiment of a heat valve according to the present invention has a pair of spaced screens of predetermined mesh. One of the screens is advantageously arranged directed toward the housing face and the other of the screens toward the back wall.

Although the fluid medium passed about the flow path defined by the housing may simply be air, and the like, directed from the housing outlet to an enclosure to be heated, alternatively this air, and the like, may be passed over the tubes of a heat exchanger in order to warm water, and the like, for more convenient storage and distribution.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
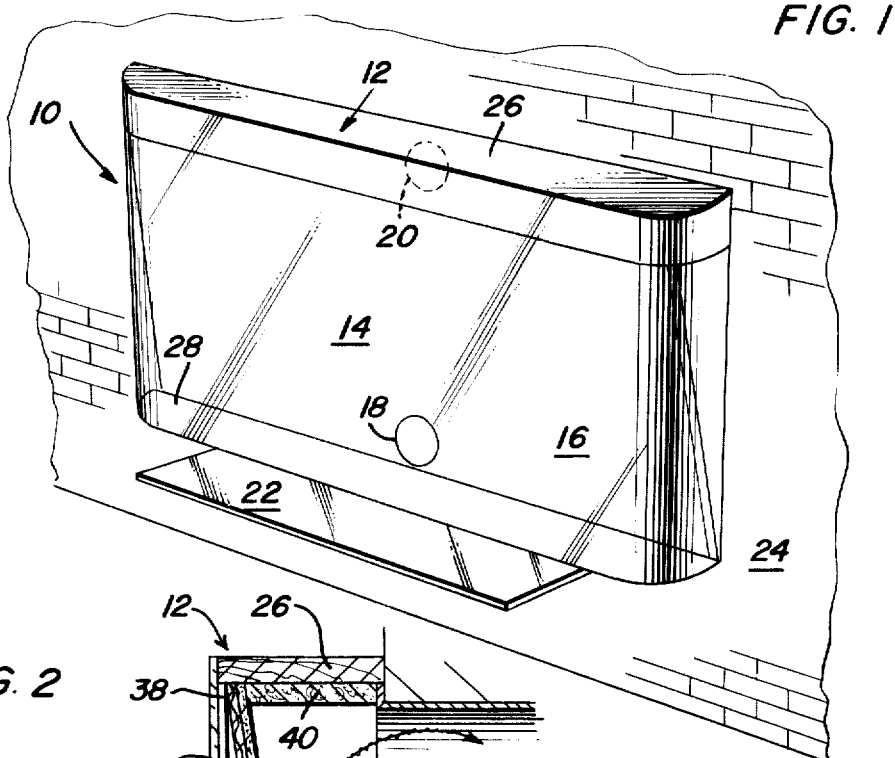
FIG. 1 is a fragmentary, perspective view showing a solar heater according to the present invention.
Figure 2:
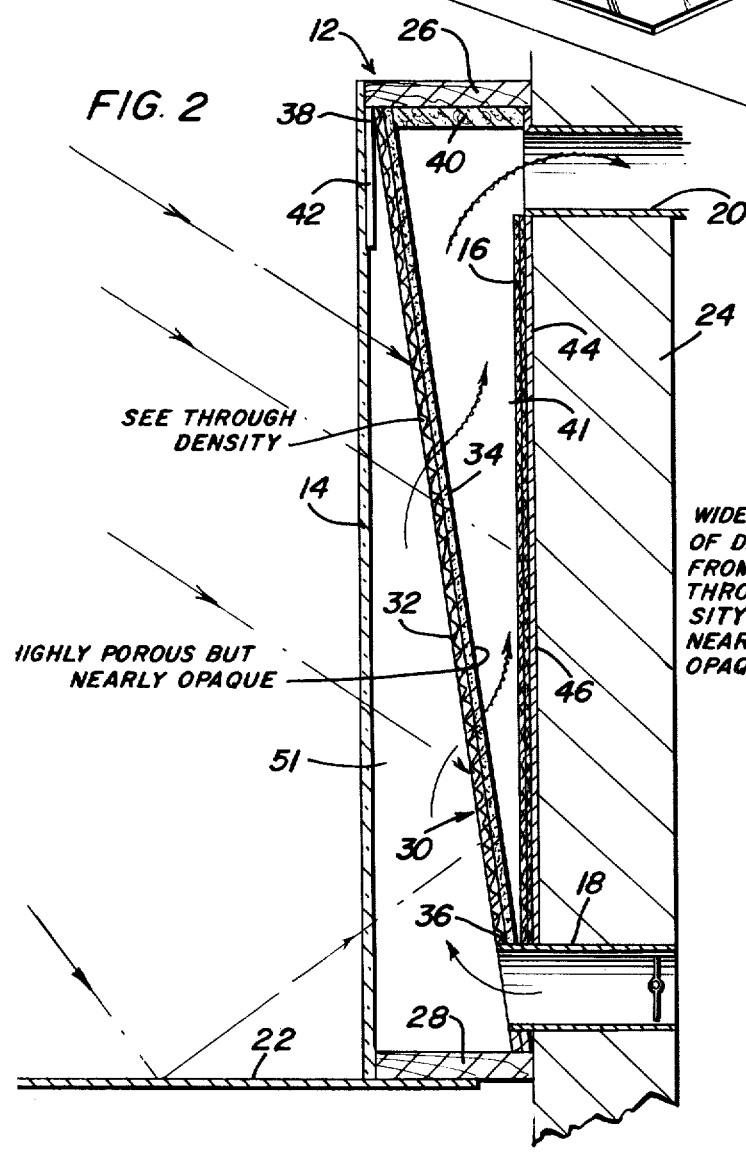
FIG. 2 is a fragmentary, vertical, transverse sectional view showing the solar heater of FIG. 1, but drawn to a larger scale.

Referring more specifically to the embodiment illustrated in FIGS. 1 and 2 of the drawings, a solar heater 10 according to the present invention has a housing 12 forming a flow path for a fluid, such as air or other suitable gas, to be heated. Housing 12 includes a face 14 arranged for passing light rays impinging thereon, and especially shortwave solar radiation, and the like. It is to be understood that face 14 may be constructed in a conventional manner from suitable, known materials, such as glass, or a thermoplastic resin. If the latter, one important parameter to use in selection is that the material should be clear and readily transmit solar radiation.

Housing 12 further includes a back wall 16 spaced from and arranged substantially parallel to face 14, and provided with an inlet 18 and an outlet 20 spaced from inlet 18. Both inlet 18 and outlet 20, which may be constructed in a suitable, known manner as from the illustrated conduit, are arranged forming part of the flow path formed by housing 12. As shown, a reflector 22 may be arranged beneath housing 12 and connected thereto for additionally increasing the efficiency of operation of heater 10 by increasing the amount of solar radiation reflected thereinto. Also as shown, housing 12 is mounted in a conventional manner on a wall 24 of a building structure to be heated. This wall 24 must, of course, be provided with openings for receiving the conduits forming inlet 18 and outlet 20. Housing 12 is completed using conventional construction techniques to include a top wall 26 and a bottom wall 28. It is to the latter wall that reflector 22 is attached in a suitable manner.

A heat valve is arranged in the housing 12 across the flow path thereof for accepting light received from face 14 and blocking the passage of heat back toward the face.

The heat valve advantageously, although not necessarily, is in the form of a substantially planar mat 30 which may be considered a filter medium in that it is constructed from a porous material, such as a fibrous synthetic resin, and formed from two layers 32 and 34. Fiber glass such as conventionally used as insulation, air filters, and the like, may be employed for constructing mat 30. Layer 32, being the layer arranged directed toward face 14, is selected to have a very low density, while layer 34, arranged directed toward back wall 16, has a density higher than the density of layer 32. It may be stated in general terms that layer 32 is of minimum density, and layer 34 of medium density. Examples of specific values for the density and radiation ratio of each layer 32, 34 is provided in the form of labels associated with FIG. 3 of the drawings. Further, layers 32 and 34 should generally be colored black, or a dark color, while layer 34 may be of a lighter color, such as gray or white.

The mat 30 employed with heater 10 is arranged extending from a point 36 on the inner end of the conduit forming inlet 18 on a side thereof oriented toward outlet 20 across the flow path to a point 38 on face 14 opposite outlet 20. As can be readily appreciated from FIG. 2 of the drawings, outlet 20 is arranged at a higher level than inlet 18 for creating a natural-circulation of the air or other medium being passed along the flow path defined by housing 12. A piece of insulation 40, which also may be conventional fiber glass insulation, and the like, is arranged along the inner surface of top wall 26 in order to cooperate with mat 30 and form a chamber 41 in which heat is collected. A double facing 42 constructed from a suitable, known material is desirably arranged along the upper edge of face 14 adjacent top wall 26 and extends from the latter to the depth of outlet 20. While back wall 16 may be constructed from an inexpensive material such as plywood which affords minimum insulation, conductance through back wall 16 can be tolerated since heat dissipated therethrough goes into the enclosure to be heated. A thin layer of an insulation 44, which may be aluminum foil, and the like, covers back wall 16, and a preferably black fabric 46, such as a cheesecloth, covers insulation 46. The latter covering absorbs heat, or more specifically solar radiation, passed through mat 30, and completes the heat collecting chamber 41.

Figure 3:
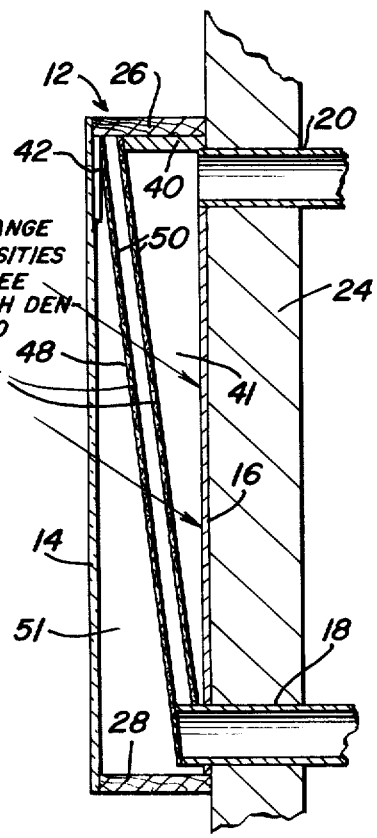
FIG. 3 is a fragmentary, vertical, transverse sectional view, similar to FIG. 2 but drawn to a smaller scale, showing a second embodiment of a solar heater according to the present invention.

The embodiment of a solar heater shown in FIG. 3 of the drawings is similar to heater 10 illustrated in FIGS. 1 and 2, but differs in that the heat valve is formed by a pair of spaced, parallel screens 48 and 50 in place of the multi-layered mat 30. Screen 48, which is preferably of less density than screen 50, is arranged directed toward face 14, and screen 50 is arranged opposite back wall 16. It is to be understood that although insulation 44 and fabric 46 have been omitted from FIG. 3 for reasons of clarifying that figure, such installation of fabric may be provided as desired. Screens 48 and 50 may be construcred in a conventional manner from fiber glass, cloth, or a metal. Examples of conventional materials which may be used for such screening are fiber glass, cloth, certain curtain material, cheesecloth, and door screening. I have discovered that screening that will allow nearly whole penetration by solar rays will effectively block a return of other heat rays. In any event, solar rays changed to heat in the screening, or any long-waves radiated to the screening from back wall 16, are cooled by the flow of cool air from the chamber 51 formed to the face 14 side of the screening into compartment or chamber 41. This flow of cool medium together with the wavelength changes caused by the screening and back wall 16 negate any likelihood of radiation to face 14 from chamber 41.

Figure 4:
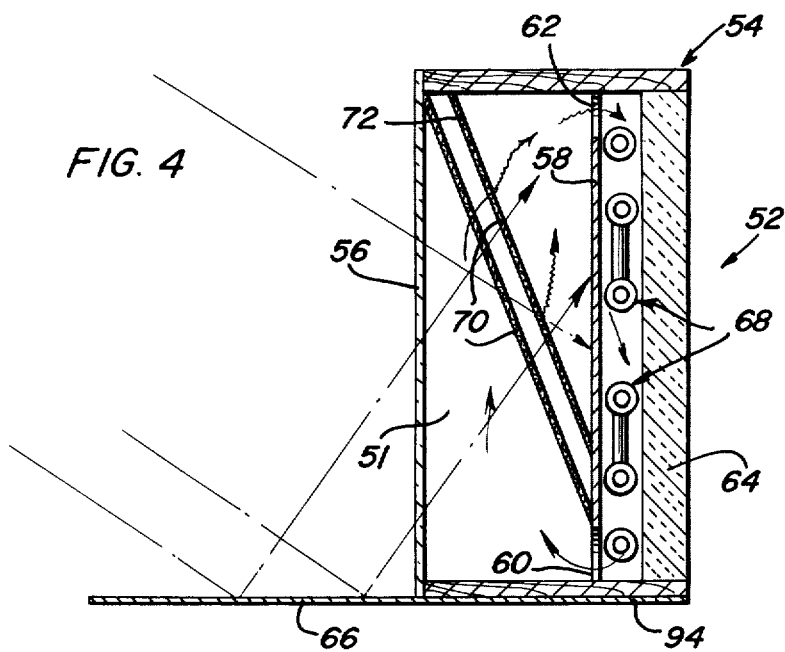
FIG. 4 is a vertical, transverse sectional view, similar to FIGS. 2 and 3, but showing yet another embodiment of a solar heater according to the present invention.
Figure 5:
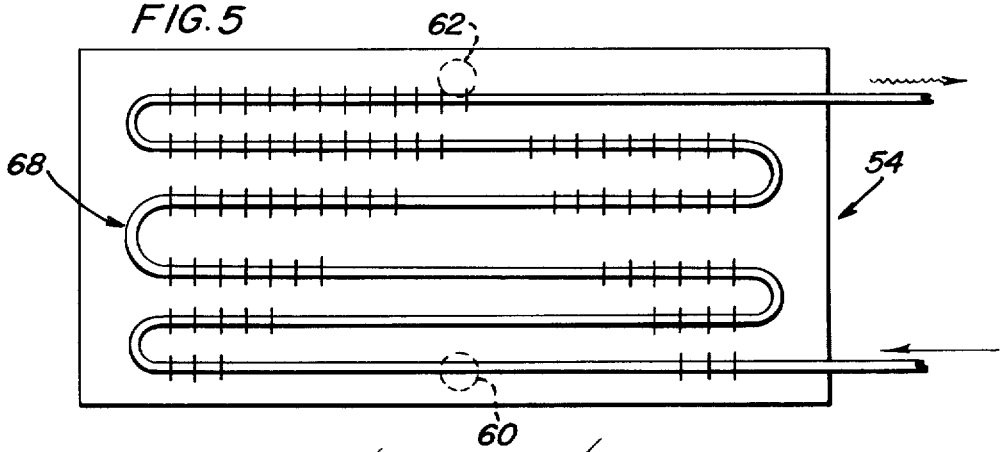
FIG. 5 is a schematic elevational representation showing the solar heater of FIG. 4.

Referring now to FIGS. 4 and 5 of the drawings, a solar water heater 52 according to the present invention is similar to the heaters shown in FIGS. 1 to 3 of the drawings, but is modified so as to use a heated gaseous medium in the flow path to heat a liquid such as water, and the like. Heater 52 has a housing 54 provided with a face 56 similar to face 14. A back wall 58 is similar to back wall 16, but is spaced inwardly from the rear of top and bottom walls of housing 54 in the manner of a partition. This back wall is provided with an inlet 60 in the form of an opening or aperture in the wall, and an outlet 62 similar to inlet 60 but spaced therefrom. An outer wall 64 advantageously constructed from a material having good thermal insulating properties, completes housing 54. A reflector 66 similar to reflector 22 may be connected to the bottom wall of the housing as shown in FIG. 4.

Back wall 58 and outer wall 64 form a compartment 67 in which is arranged a bank 68 of preferably thin heat exchanger tubes, best seen in FIG. 5. As can be appreciated, bank 68 is arranged within housing 54, but on a side of back wall 58 facing away from face 56 for absorbing heat from a flow path medium, such as air, and heating a fluid, such as water, passing through the tubes of the bank. A pair of screens 70 and 72, similar to screens 48 and 50, form the heat valve for heater 52. It is to be understood, however, that a mat such as that designted 30 in the embodiment of FIGS. 1 and 2 may be substituted for screens 70 and 72 if so desired.

Figure 6:
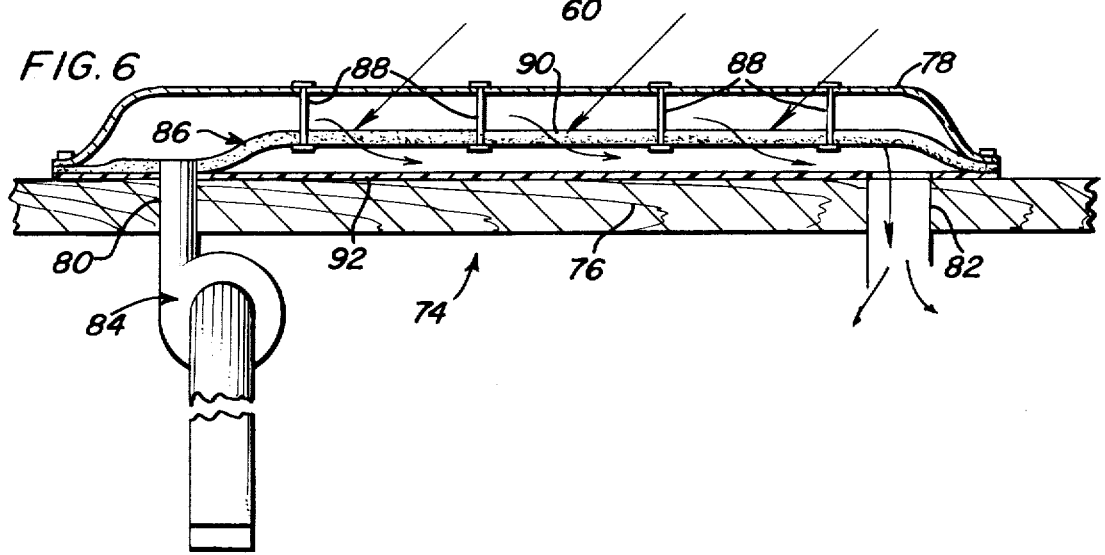
FIG. 6 is a fragmentary, vertical, longitudinal sectional view, showing still another embodiment of a solar heater according to the present invention.

A flat solar heater 74 is shown in FIG. 6 of the drawings. This heater 74 is advantageously arranged on a roof 76, and the like, or other suitable horizontal surface. Heater 74 has a cover 78 which forms both the housing and face of this heater and is advantageously constructed from an optically clear synthetic resin such as those described above in connection with face 14. An inlet 80 and an outlet 82, both in the form of openings in roof 76, place the area under cover 78 in communication with the enclosure to be heated arranged beneath roof 76.

A conventional blower 84, and the like, is arranged in the opening forming inlet 80 to create a draft which moves air, and the like, along the horizontal extent of the flow path formed by roof 76 and cover 78. A black filter media 86, which may be a fibrous mat or a screen as described above, is arranged beneath cover 78 and connected thereto at points 88 as by conventional stitching or the use of a suitable adhesive. The median portion 90 of the heat valve is arranged parallel to the face formed by cover 78 and to roof 76 over which is advantageously arranged a layer of black heat-collecting material 92. Thus, roof 76 forms a surface equivalent to back wall 16, 58. Operation of heater 74 is similar to that of the heaters described above.

Cover 78 is advantageously constructed from a flexible sheet of plastic, and more specifically from three flexible sheets secured to a wall or roof 76 as by the illustrated bats. The inner layers, black porous filter media or cloth, are secured to cover 78 as shown so that pressure from blower 84 expands cover 78 away from back seal layer 92. The chamber when blown up forms a flow path next to the face, or cover 78, then through the filter media 86 to the rear or lower chamber and out outlet 82. Although the heater illustrated in FIG. 6 is specifically intended to be mounted horizontally, it is to be understood that it may also be mounted vertically if so desired.

In operation, all embodiments are similar in that the solar rays, designated by the long, straight arrows, enter through the associated face of the heater and partially or fully penetrate the heat valve. On this penetration, the solar rays change to heat rays of longer wavelength, and hence are absorbed by the air or other flow path medium for heating same. This will expand air or other gas and cause it to rise, thus creating a current drawing in cold air through the inlet 18. From chamber 51, the medium passes through the heat valve, into chamber 41, and out the outlet into the area to be heated. Although the illustrated embodiments are effective enough without the use of a reflector 22, 66, the reflectors arranged at the base can be desirable in extremely cold climates.

Since the heat is formed within the filter media, or heat valve, outward radiation is prevented by that portion of the filter media through which solar rays have penetrated. The back wall or layer, 16, 58, or 92, is covered black to receive rays penetrating completely through the filter media and radiation to the glass face in this case is blocked by the complete layer of filter mediia. When screens are used as the filter media to form a heat valve, the screens should be of minimum density. That is, they should have a high number of openings per unit length. Examples of screen densities suitable for use in such an application are given in the form of labels associated with FIG. 3 of the drawings.

The heaters illustrated in FIGS. 1 through 5 of the drawings need no external power as is. They are silent and efficient, and adaptable to automatic operation. Although no blower is required in any of the embodiments of FIGS. 1 to 5 such a blower can be installed at either the inlet or the outlet of same. Further, a damper valve (not shown) can be draft operated by a thermostatic spring (not shown), a solar eye operated blower (not shown), a flap valve actuated by air pressure (not shown), and the like. A damper valve need only be provided on the lower, or inlet duct or opening. Heavy, cold air will not enter through the top, or outlet duct or opening when the bottom duct or opening is closed. It is evident that the common operation of the various embodiments described above is based on two elementary concepts. These concepts are: Firstly, as solar rays strike the outer reaches of the filter media and are changed to heat, the heat is immediately dissipated to the on-rushing cooler air on the flow path thus preventing radiation back to the face of the unit. The further into the filter media the solar rays are changed to heat, the warmer the on-rushing air becomes, but the more protection from radiation back to the unit face is effected by the additional portion of filter media between this area and the face. Rays completely penetrating through the filter media strike the black back wall and are afforded the protection of the complete thickness of filter media. Secondly, the complete separation of the heated area from contact with the face of the unit is achieved by the filter media and by the air flow pattern.

In the water heater embodiment illustrated in FIGS. 4 and 5 of the drawings, air circulation is continuous, thus permitting the addition of heat to the air as it is absorbed by the tubes of heat exchanger bank 68. This unit is capable of efficient water or fluid heating or steam generation. As mentioned above, either a fibrous mat or screens may be used as the heat valve. A damper 94 is advantageously provided to control speed of the circulating air. This action will synchronize the heating and cooling cycle to permit full utilization of the heated air before it is returned via the face compartment 51. With a given demand, this can merely be a predetermined restriction. Face 56 of this unit can be double-faced or partially double-faced at the top portion only for use with high operating temperatures. A unit of this kind has been found satisfactory for heating water coming into bank 68 at a temperature of, for example, 60°F. to a temperature of, for example, 170°F.

To again summarize the operation of a heater according to the present invention, solar energy is changed to heat, then to heated air half-way or more through the heat valve where the heated air rises from the face compartment into the back wall compartment. This action creates a circulatory motion drawing in air at the inlet and expelling it at the outlet. The heated air is not exposed to the outer face of the housing. Solar energy is transferred inside the heat valve so heat is not radiated outward. Heat is swept inward by the continuous air action.

As will be readily appreciated from the above description and from the drawings, a heater according to the present invention captures heat energy internally and eliminates radiation to the face and conduction by convection to the face. The efficiency of a heater according to the present invention approaches the maximum possible for this kind of device. Further, a heater according to the present invention permits attainment of temperatures in the range of, for example, 150° to 220°F. in conjunction with the quick conversion and release of solar light rays to heat energy.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A solar heater, comprising, in combination:
  a. a housing forming a flow path for a fluid to be heated and including a face arranged for passing solar rays impinging thereon, the housing further including a back wall spaced from and substantially parallel to the face, and an inlet and an outlet spaced from the inlet being provided in the back wall and arranged forming part of the flow path; and
  b. heat valve means arranged in the housing across the flow path thereof for accepting light rays received through the face and blocking the passage of heat back toward the face, a flexible transparent sheet forming the housing face, and the heat valve means including a flexible mesh attached to the flexible sheet at predetermined points thereof, and further including a blower arranged in the inlet for creating a pressure under the flexible sheet and separating same from the back wall while simultaneously creating a forced draft flow path for a medium to be heated.

2. A structure as defined in claim 1, wherein the back wall is colored black and forms a heat collecting chamber in conjunction with the heat valve means.

3. A heliothermal process, comprising the steps of:
   a. providing an enclosed flow path for a fluid to be heated in a housing having a solar ray transmitting face and a back wall opposite the face;
   b. arranged across the flow path a porous barrier having two layers, the layer opposite the face having a density lower than the density of the layer opposite the back wall, and which passes solar rays and the fluid to be heated therethrough, while blocking heat from returning through the barrier in a direction opposite to that of the impinging solar rays;
   c. trapping heat in a chamber partially formed by the porous barrier and a blackened wall arranged opposite the barrier; and
   d. sweeping heat from the chamber.

4. A solar heater, comprising, in combination:
   a. a housing forming a flow path for a fluid to be heated, and including a face arranged for passing solar rays impinging thereon, the housing further including a back wall spaced from and substantially parallel to the face, and an inlet and an outlet, the latter spaced from the inlet, the inlet and outlet being provided in the back wall and arranged forming part of the flow path, the back wall surface opposite the face being colored black; and
   b. porous heat valve means including a substantially planar mat constructed from a porous material arranged in the housing across the flow path thereof for accepting light rays received through the face and blocking the passage of heat back toward the face, the mat having two layers, the layer opposite the face having a density lower than the density of the layer opposite the back wall, and the mat and back wall cooperating to form a heat collecting chamber within the housing.

5. A structure as defined in claim 4, wherein the mat is arranged extending from a point on the outlet side of the inlet to a point on the housing face opposite the outlet, the outlet being arranged at a higher level than the inlet for creating a natural-circulation of a medium in the flow path.

6. A structure as defined in claim 4, wherein the heat valve means includes screening across the fluid flow path.

7. A structure as defined in claim 6, wherein the screens are arranged extending from a point on the outlet side of the inlet to a point on the housing face opposite the outlet, the outlet being arranged at a higher level than the inlet for creating a natural-circulation of a medium in the flow path.

8. A structure as defined in claim 6, wherein a heat exchanger is arranged within the housing on a side of the back wall facing away from the housing face for absorbing heat from a flow path medium and heating a fluid passing through the tubes, the back wall being a false wall.

* * * * *